United States Patent [19]

Turngren

[11] Patent Number: 4,869,369
[45] Date of Patent: Sep. 26, 1989

[54] FOAM BRACED PACKAGING AND METHOD AND APPARATUS FOR CONSTRUCTING SAME

[76] Inventor: Christina M. Turngren, 339 Chestnut St., St. Paul, Minn. 55102

[21] Appl. No.: 198,224

[22] Filed: May 25, 1988

Related U.S. Application Data

[62] Division of Ser. No. 84,425, Aug. 11, 1987.

[51] Int. Cl.$^4$ .......................... B65D 85/30; B65D 5/50
[52] U.S. Cl. ..................................... 206/523; 206/453; 206/586
[58] Field of Search ............... 206/523, 521, 605, 586, 206/453

[56] References Cited

U.S. PATENT DOCUMENTS

| | | | |
|---|---|---|---|
| Re. 29,658 | 6/1978 | Rous | 206/605 |
| 2,250,491 | 7/1941 | Lurrain | 206/586 |
| 3,684,636 | 8/1972 | Rothrock, Jr. et al. | 206/586 |
| 4,113,096 | 9/1978 | Scott | 206/586 |
| 4,583,639 | 4/1986 | Fedick et al. | 206/586 |
| 4,700,844 | 10/1987 | Griffith | 206/586 |
| 4,709,817 | 12/1987 | Keady et al. | 206/523 |
| 4,771,885 | 9/1988 | Linnemann | 206/521 |

FOREIGN PATENT DOCUMENTS

277104  9/1927  United Kingdom ................ 206/453

*Primary Examiner*—Joseph Man-Fu Moy
*Attorney, Agent, or Firm*—Vidas & Arrett, P.A.

[57] ABSTRACT

A method and apparatus for manufacturing custom-sized foam braced packaging. The apparatus includes means for automatically adjusting the assembler to meet the particular needs of individual package sizes without the requirement for retooling being imposed. Rails are formed from foam and an outer wrap or covering which are then mitered to define a package shape. Packaging material is then adhered to the rail frame to complete the package.

5 Claims, 3 Drawing Sheets

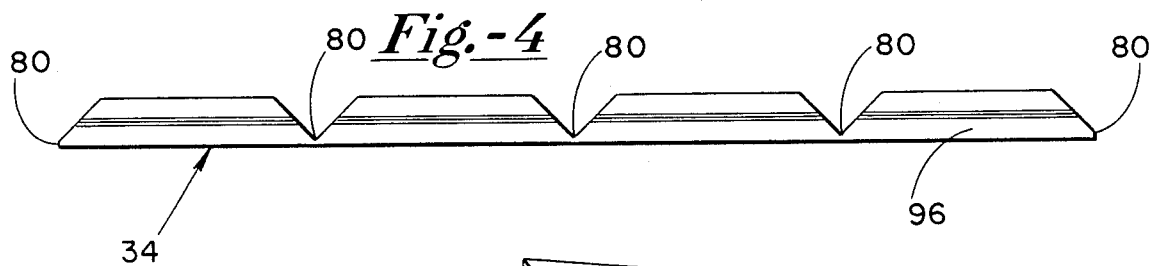
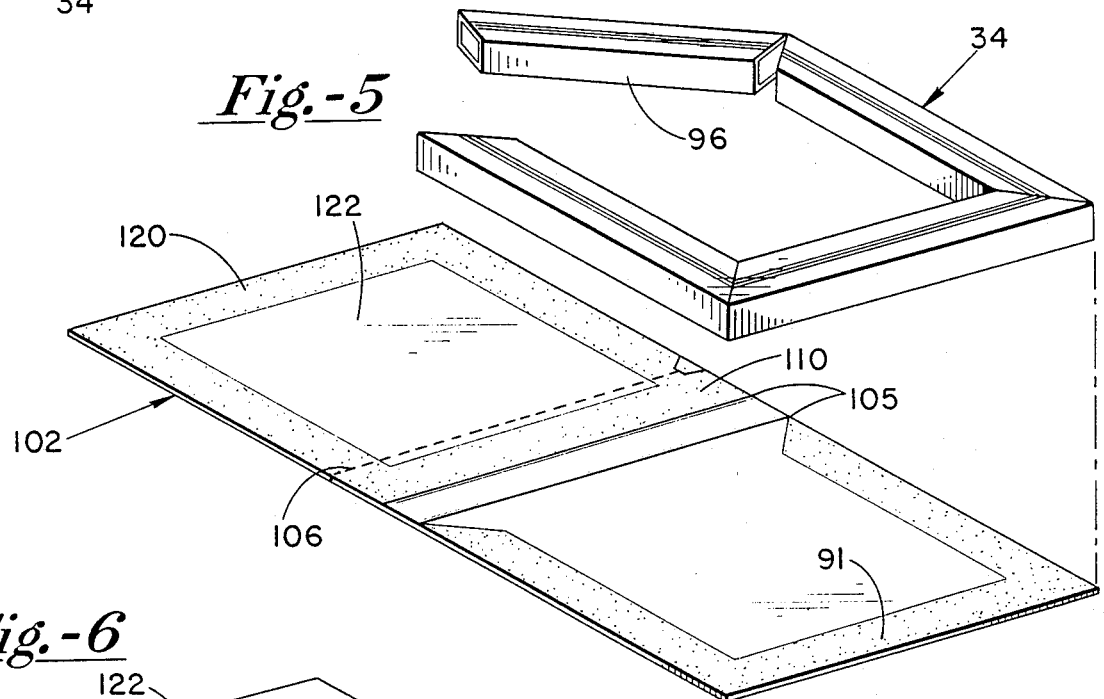
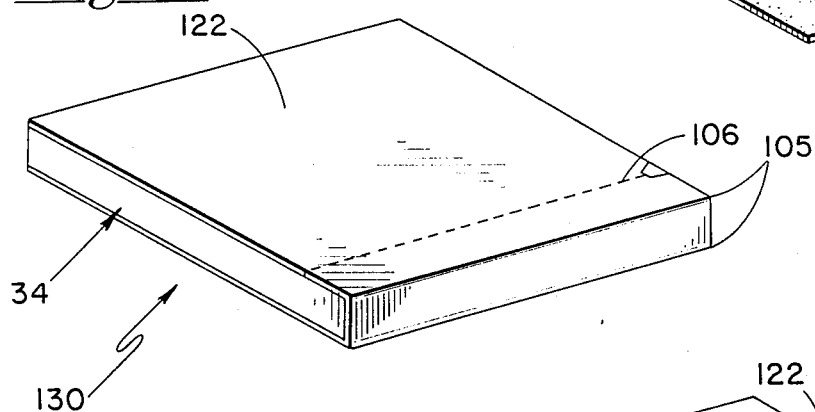
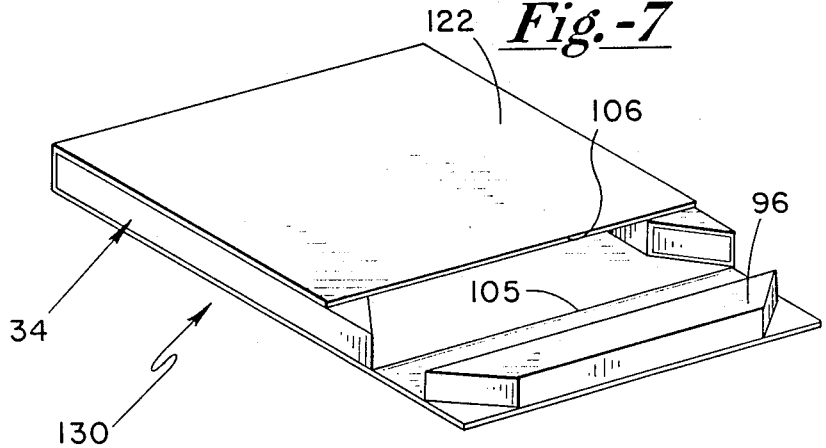

FOAM BRACED PACKAGING AND METHOD AND APPARATUS FOR CONSTRUCTING SAME

This is a divisioned of co-pending application Ser. No. 084,425 filed on Aug. 11, 1987.

FIELD OF THE INVENTION

The present invention is related to the field of product packaging for shipping and storage purposes. More particularly, the invention is specifically directed to a carton design and method and apparatus for manufacturing custom-sized foam braced packaging.

BACKGROUND OF THE INVENTION

Various types of protective packaging systems have been used for containing a product after its processing or manufacture but prior to the sending of the product to the ultimate consumer. An example in wide use is the corrugated box. It is, however, impractical for a manufacturer of a product to have a large inventory of a wide range of sizes of corrugated boxes where the products being manufactured are of significantly different dimensions.

Where boxes are not built to fit the particular product, however, but are "make do", damage to the product is more likely to occur. Extra packaging materials needed to prevent damage increases the costs associated with the product. Where the product is quite fragile and/or heavy, and varies widely in size, as is true, for example, with lithographic plates, the costs associated with extra packaging materials and damage during transit, due to a poor fit between plate and box, are high. Additionally, types of boxes currently in use lack sufficient structural integrity to withstand high density stacking and warehousing conditions, as well as shipping mishandling wherein shock and compression are brought to bear upon them.

What is needed is packaging that closely fits the product enclosed and which is made as sturdy as possible and with as much reinforcement as necessary for each particular job. If a process to make the boxes as needed were cost effective, the need for a large storage space for boxes of varying sizes and degrees of reinforcement would be eliminated. Additionally, such boxes could be used to securely store the product once it reaches its final destination.

It is to these problems in the prior art that the invention of the present document is directed. It is an apparatus and cartoning method which can be applied to a product of virtually any size or weight. Additionally, it can be practiced using an assembly line. Because of its unique flexibility, the apparatus and method of the invention can be employed to accommodate irregularly shaped and variably weighted products, and packaged them for safe shipping.

SUMMARY OF THE INVENTION

The present invention is to a method and apparatus for forming custom-sized foam braced packaging and the packages so created. It includes forming foam into a rail of a desired thickness that can be cut to various lengths. Once a length of the foam rail is cut, it can be shaped into an enclosure having a three or more sided frame. Thereafter, the foam frame is mounted onto reinforced packaging material.

The foam frame forming apparatus may be utilized to produce rails with a foam interior wrapped with a protective, and/or decorative outer wrap.

The foam is extruded from a foam source into a forming chamber wherein the rail is formed with a desired thickness and configuration. While in the forming chamber, the foam rail is coated by one of a variety of covering materials. The coated or enveloped rail is retained for a specified time within the forming chamber to be cured to maintain its size and shape.

The foam rail is then cut to a length in accordance with a predetermined specification. The preferred embodiment utilizes an adjustable cutter for cutting the rail. Mitering of the rail at specified points can be accomplished by use of a water jet system to cut the edge of the rail and to form a miter joint. The length of rail is then transferred to a station where it is shaped into a foam frame of a desired size. The rail may be shaped into an enclosure with the use of pivoting arms which close the miter joints. Alternatively, the mitered rail may simply be driven against a barrier which will cause it to fold back upon itself along the miter points. The closure could thus be made by pushing the mitered rail like "wet noodle" against a barrier.

Thereafter, the miter assembly is transferred to a station where adhesive is applied to one side of the rail. The shaping of the foam rail into a multi-sided frame is accomplished by bending the foam rail segments at mitered points by use of adjustable pivoting arms that pivot to a desired angle for urging the foam segments into one of various shapes. Reinforced packaging material of a comparable size is applied to the foam frame and adhered thereto by the adhesive. The reinforced packaging material is pressed to the foam frame to form a seal.

Such reinforced packaging material can be cut, as indicated above, to the desired size by adjustable cutting means. The adjustable cutting means can be programmed to cut the packaging material to the required size. The preferred embodiment utilizes a water jet cutter, although other cutting means are also envisioned.

The method of the invention can be practiced by providing for insertion of the product to be packaged during the manufacture of the package. By inserting the product within the foam frame, the top portion of the reinforced packaging material can be folded over the frame enclosed product to thereby envelope the product. Adhesive then seals the top portion of the reinforced packaging material to the foam frame.

The present invention also encompasses apparatus for forming custom-sized foam braced packaging. Such apparatus includes means for forming the foam into a rail of cross-sectional dimensions and configuration in accordance with define specifications, means for shaping the foam rail into a multi-sided foam frame, and reinforced packaging material on which the multi-sided foam frame is mounted. The means for forming the foam into a rail in accordance with defined specifications includes means for extruding the foam into a forming chamber that receives the foam and molds it into the intended dimensions. The shaping means comprise apparatus for mitering the foam rail at points for forming bendable joints, and arms for bending the foam rail at these miter points.

After forming the foam rail into a multi-sided frame, pre-cut reinforced packaging material is adhered to the frame. The cutting means used in the preferred embodiment comprise water jet cutters. Other cutting means are, however, also envisioned. The mitering means also anticipate the use of a water jet cutter. Additionally, a water jet cutter can be used for pre-sizing the reinforced packaging material.

The mounting of the multi-sided foam frame onto reinforced packaging material includes applying adhesive to one surface of the multi-sided foam frame, pressing of a pre-sized reinforced packaging material sheet to that adhesive-applied side, inserting the product to be packaged within the custom-sized foam frame, applying adhesive to a second side of the foam frame, and folding the top portion of the pre-sized reinforced packaging material over the foam frame to envelope the product therein.

A preferred embodiment envisions the forming of four sided foam packaging frames although multi-sided frames of any configuration can be made. An alternative embodiment includes forming a foam core frame for use with different "skin" products for a variety of purposes. An example would be aluminum, wood and thermoplastic window frames.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain embodiments of the invention.

BRIEF DESCRIPTION OF THE DRAWINGS

In the drawings in which like reference numerals denote like elements throughout the several views.

FIG. 4 is a top view of a foam rail with miter points cut;

FIG. 5 is an exploded view of a partially assembled foam frame package;

FIG. 6 is a perspective view of a fully assembled foam braced package with the product sealed therein, and having a tear strip illustrated; and FIG. 7 is a perspective view of the foam braced package of FIG. 6 with the tear strip having been used to rip a cut across the face of one panel of the assembled foam braced package to allow access to the product.

DETAILED DESCRIPTION OF THE INVENTION

Figure 1:
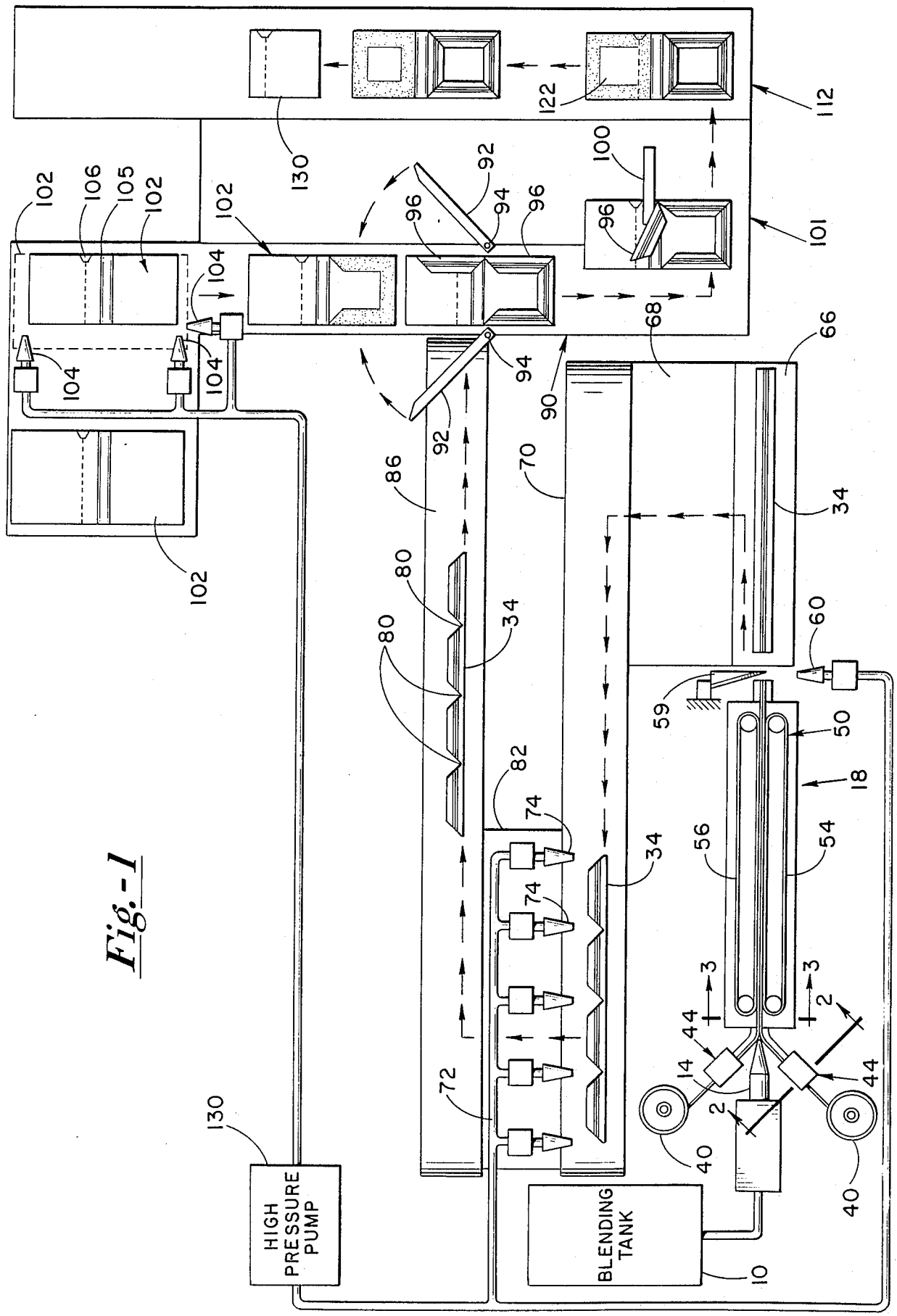
FIG. 1 is a schematic diagram of an apparatus in accordance with the present invention for constructing foam braced packaging.

FIG. 1 shows a schematic diagram of the foam braced packaging method and apparatus in simplified form. A source of foam 10 is provided. The foam is extruded from source 10 through a nozzle 14 into a forming chamber 18 where it is formed into a rail of desired dimensions.

Figure 3:
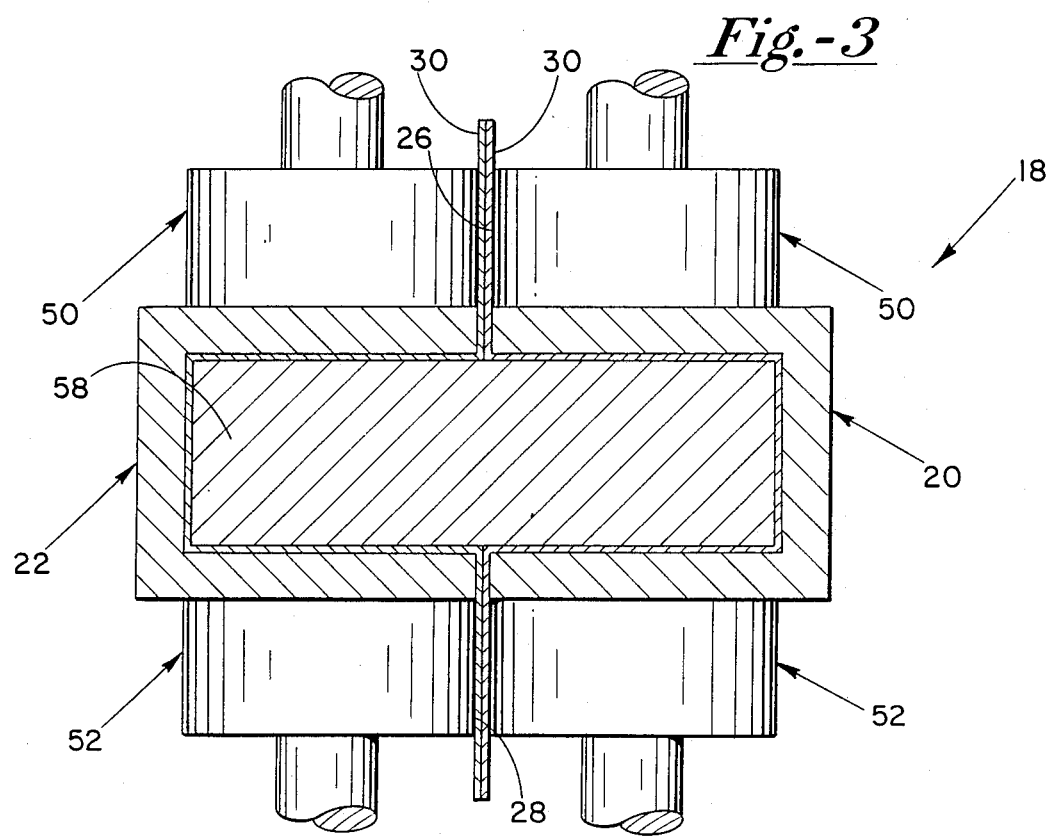
FIG. 3 is a sectional elevation view taken along line 3—3 of FIG. 1.

The forming chamber 18 includes a pair of U-shaped side supports 20, 22 to restrict lateral foam expansion. As shown in FIG. 3, the U-shaped side supports restrict lateral and vertical foam expansion to the configuration defined by the supports. Of course, the supports may be of any shape so long as a foam restricting cavity is defined which has an upper 26 and lower slot 28 through which the enveloping material 30 may project.

Figure 2:
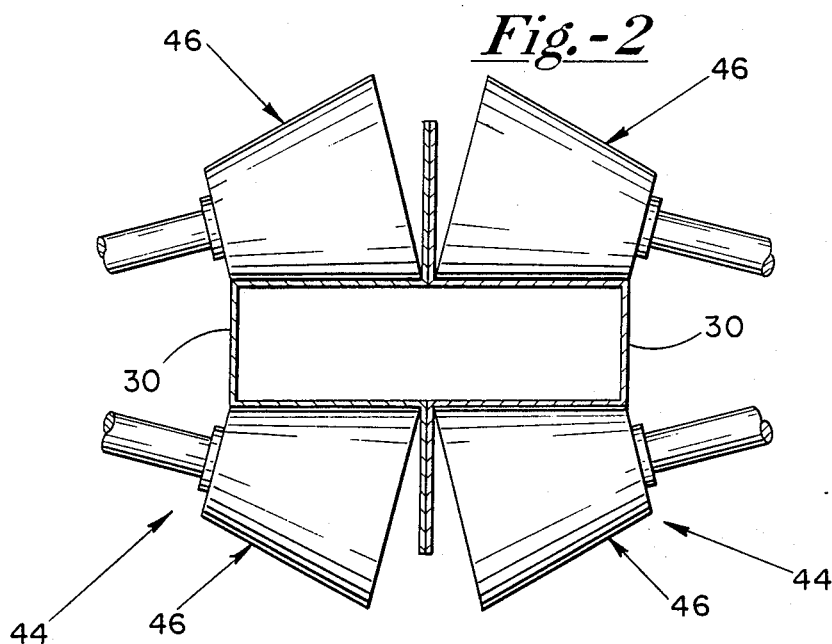
FIG. 2 is a sectional elevation view taken along the line of 2—2 of FIG. 1.

It is in the forming chamber 18 that paper 30 or other material is applied to the surface of the rail 34 as a "skin." The enveloping material is retained on spools 40 and fed into the forming chamber station. The foam rail is retained within chamber 18 for curing to insure maintaining its shape and size. As shown in FIG. 2, the enveloping material 30 may be crimped into a shape approximating the shape of the chamber 18. Paper crimper 44 as shown includes a plurality of matched rollers 46 which pre-bend the paper.

The rollers 46 may be knurled 48 as shown to assist in forming sharp corners in the paper 30.

If other enveloping materials are employed, other shapers may be utilized. For example, an aluminum skin may be predrawn as in the case of forming rain gutters. Plastics may be extruded into the shape required as a skin.

The paper 30 or other enveloping material extends through slots 26, 28 as shown. The expanding foam presses the material 30 against the sides of the forming chamber 18. The paper or other enveloping material 30 is pulled through the length of chamber 18 by synchronized belt drives 50, 52 which press against the ends of material 18 which extend through slots 26, 28 as shown in FIG. 3. Belts 54, 56 on the drive 50, 52 exert pressure against the excess paper which pulls the paper through the chamber 18. The belts for driver 50 are not shown. The foam 58 moves through the chamber 18 due to its expansion and pressure from additional foam from nozzle 14. After exiting chamber 18, the ends of paper 30 are shaved off with a fixed, shaving cutter 59. Cutter 59 cuts paper 30 which extends beyond slots 26, 28. Cutter 59 may simply be in the form of a knife at the end of chamber 18.

Once the foam is cured, it proceeds along to cutter 60. A water jet cutter is envisioned in the preferred embodiment. Foam rail 34 is cut to one of various possible lengths by cutter 60. Cutter 60 serves to cut a rail 34 into the length needed for the desired package. The end of chamber 18 may also include a cutter (not shown) to shave the excess paper from the rail.

The discrete lengths of rail 34 then pass onto a takeaway conveyer 66 which acts as an overspeed controller to handle the volume of rails produced. The rails 34 are then transformed across a transfer table 68 to a second continuous conveyor 70 which conveys it to a mitering station 72. Here mitering cutters 74 (again, the envisioned embodiment utilizes water jet cutters) bevel the rail 34 at points thereon to form miter joints 80. Joints 80 are shown in FIGS. 4 and 5 and function to enable shaping of the foam rail into a multi-sided frame. Mitering occurs at station 72 and the frame 34 is transferred across a second transfer table 82 to conveyor 86.

The length and location of miter points are able to be varied to allow for the forming of packages of various sizes. A series of standard sizes can be pre-programmed into the apparatus to allow for ease of packaging size selection. Microprocessors or other devices can be employed to position cutters 74.

After the miter joint cuts 80 are made, the foam rail 34 is conveyed again, by a third continuous conveyer 86, to an assembly station 90. Here an adhesive sbustance 91 is applied to the bottom side of three "fixed" arms of the frame. In FIG. 5, the adhesive is shown on the periphery of a package material blank 102.

Arms 92 are made to pivot about pivot points 94 and bend the foam rail into a multi-sided frame 96 with the miter joints 80 closed. The fourth, unglued side 96 of the frame is closed by another arm 100 as the packaging material 102 and frame 34 move on conveyor 101. If the "wet-noddle" theory outlined previously is to be used, a single bar such as one of arms 92 may be affixed in the closed position as indicated by arrows in FIG. 1. A rail would strike the bar, whih due to its miter cuts, would readily bend upon itself to close the miter joints.

Concurrently, reinforced packaging material 102 that has previously been sized by a cutter 104 by being cut along three mutually perpendicular axes is transferred to assembly station 90. At station 90, it is applied to the adhesive bearing side of the foam frame 34. The reinforced material is previously scored, shown as scorer 105 to allow the top portion of the reinforced material to be folded over the foam frame to thereby close it. A tear strip 106 can also be incorporated into the packaging material 102. The packaging material is available commercially with both the tear strips and scoring. Only the length and width of the material needs to be cut by cutter 104 to provide custom packaging.

The reinforced foam frame 34 is transferred to a finishing station, and the product to be packaged can be inserted by dropping it into the opening defined by the legs of rail 34. After the product is inserted, adhesive 120 is applied to packaging 122, and the upper portion 122 of the packaging material 102 is folded, at the scores 105, around the frame 34 to enclose the product and form a finished carton 130.

In the exploded view of FIG. 5, adhesive 110 from arm 96 is shown for convenience on packaging material 102.

FIG. 3 illustrates a cross-sectional view of the foam rail 34 with the paper skin 30 applied thereto. This cross-sectional view of the foam rail 34 is taken across the forming chamber station 18 at a location where the chamber 18 shapes the rail 34 to a desired shape and size. The shaped paper contacts the defining walls of supports 20, 22, and the extruded foam 58 expands to the dimensions of the chamber. Obviously, any size and shaped chamber may be utilized as desired to form the rails.

FIG. 4 illustrates a perspective view of a foam rail 34 that has been formed encased in an enveloping skin 30 and cured to maintain its size and shape. Curing may be needed for some foams. That figure illustrates the miter joints 80 of the formed foam rail 34 after the cuts have been made. The water jet cutters 74, as is also true of cutters 60 and 104 positioned at various points along the assembler, can have a common pump 130, shown in FIG. 1, to which they are attached and from which they get their power.

FIG. 5 illustrates a nearly completely formed reinforced foam frame 110. In this Figure, the foam frame 34 has been applied to the reinforced packaging material 102 on one side thereof. The frame 34 has been pulled loose from adhesive 91 to show details of construction. After the product has been inserted, the front cover 122 of the packaging material 102 can be folded over the frame 34 to enclose the inserted product 120.

FIGS. 6 and 7 illustrate the completed foam braced package or carton 130. FIG. 7 shows the package opened along tear strip 106 for easy access to the product stored therein. The fourth arm of the foam frame 96 is shown adhered to the cover 122 so that, when the tear strip 106 is pulled to separate the top panel of the packaging material, it is retained by adhesive 110 to the ripped section of the material. Such an opening allows the product 120 to be made easily accessible while stored in the packaging. The finished package may then be transferred to a labelling station and palletizing station.

Numerous characteristics and advantages of the invention covered by ths document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A package comprising:
   (a) a rail of extruded foam having two ends, said rail including miter cuts and said rail being moved so as to close said miter cuts and connect said ends such that said rail defines a closed protective frame; and
   (b) reinforced packaging material being secured to sides of said frame so as to define an interior region into which an object may be packaged.

2. The package of claim 1 wherein said foam rail includes a protective overwrap of enveloping material, said enveloping material selected from the group consisting of paper, plastic, wood veneer and metal.

3. The package of claim 1 wherein said rail includes a plurality of miters which define legs on each side of the miters, said rail being bent at said miters to close the miters to define an enclosure and is shaped into a rectangular frame with all but one of said legs of said frame rail being secured to said reinforced packaging material.

4. The package of claim 3 wherein said reinforced packaging material includes a tear strip to allow access into the interior region of said package.

5. A package comprising:
   (a) a rail of extruded foam having two ends, said rail including miter cuts defining separate legs to the rail and said rail being moved so as to close said miter cuts such that said ends may connect to define a closed protection frame; and
   (b) a single sheet of reinforced packaging material secured to the same surface of all but one of said separate legs of said rail, said other separate leg being secured to said reinforced packaging material on another surface of said other leg.

* * * * *

UNITED STATES PATENT AND TRADEMARK OFFICE
CERTIFICATE OF CORRECTION

PATENT NO. : 4,869,369

DATED : September 26, 1989

INVENTOR(S) : Christina M. Turngren

It is certified that error appears in the above-identified patent and that said Letters Patent is hereby corrected as shown below:

Col. 1, line 5, delete "divisioned" and insert therefor -- divisional --

Col. 2, line 25, delete "miter" and insert therefor -- mitered --

Signed and Sealed this

Fourteenth Day of August, 1990

Attest:

HARRY F. MANBECK, JR.

*Attesting Officer*   *Commissioner of Patents and Trademarks*